United States Patent [19] [11] 4,257,283
Haller et al. [45] Mar. 24, 1981

[54] STEPPING MECHANISM FOR A MULTI-POSITION SWITCH

[75] Inventors: Heinrich Haller, Fahrweid/Geroldswil; Hans Wermelinger, Rümlang, both of Switzerland

[73] Assignee: Contraves AG, Zurich, Switzerland

[21] Appl. No.: 16,016

[22] Filed: Feb. 28, 1979

[30] Foreign Application Priority Data

Mar. 17, 1978 [CH] Switzerland .......................... 2922/78
Nov. 8, 1978 [CH] Switzerland .......................... 11476/78

[51] Int. Cl.³ .............................................. F16H 27/02
[52] U.S. Cl. ......................................... 74/128; 74/160; 74/578; 200/156
[58] Field of Search .................. 74/128, 129, 160, 161, 74/527, 530, 575, 578; 335/123, 140; 200/11 R, 156

[56] References Cited

U.S. PATENT DOCUMENTS

| | | | |
|---|---|---|---|
| 2,645,945 | 7/1953 | Homkes | 74/128 X |
| 3,078,733 | 2/1963 | Emery | 74/128 |
| 3,331,038 | 7/1967 | Foster et al. | 335/123 |
| 3,375,337 | 3/1968 | Barrett et al. | 335/140 X |
| 3,435,167 | 3/1969 | Pfleger | 200/156 |
| 3,654,413 | 4/1972 | Jordan et al. | 335/140 X |
| 3,748,915 | 7/1973 | Winter et al. | 74/128 |
| 3,802,282 | 4/1974 | Cook | 74/128 |
| 4,038,508 | 7/1977 | Mapelsden | 74/527 X |
| 4,112,278 | 9/1978 | Greiner et al. | 74/575 X |

FOREIGN PATENT DOCUMENTS

| | | | |
|---|---|---|---|
| 1590953 | 6/1970 | Fed. Rep. of Germany | 74/128 |
| 1549987 | 9/1971 | Fed. Rep. of Germany | 74/128 |

*Primary Examiner*—Lawrence J. Staab
*Attorney, Agent, or Firm*—Werner W. Kleeman

[57] ABSTRACT

Within a housing of a multi-position switch there is arranged a forwardly and backwardly indexible stepping mechanism comprising two actuation elements which can be individually brought into engagement with a pinion of a character support or carrier by accomplishing a linear working movement. Each actuation element comprises a push-button, a switching or indexing element and a preferably hairpin-shaped spring element, or is operatively connected with a coil spring mounted in the housing. By means of each push-button the related actuation element is moved in a first direction, whereby its switching element, guided by a first pin along a cam or equivalent structure, is deflected, and a second pin comes into engagement with the pinion, so that this pinion, which is rotatably mounted upon a shaft, can be moved in a predetermined direction against the restoring force of a latching spring engaging into a tooth gap of the pinion by means of a latching cam or nose. The return of such actuation element, after completion of the indexing step, is accomplished by the restoring force of the related spring element.

6 Claims, 8 Drawing Figures

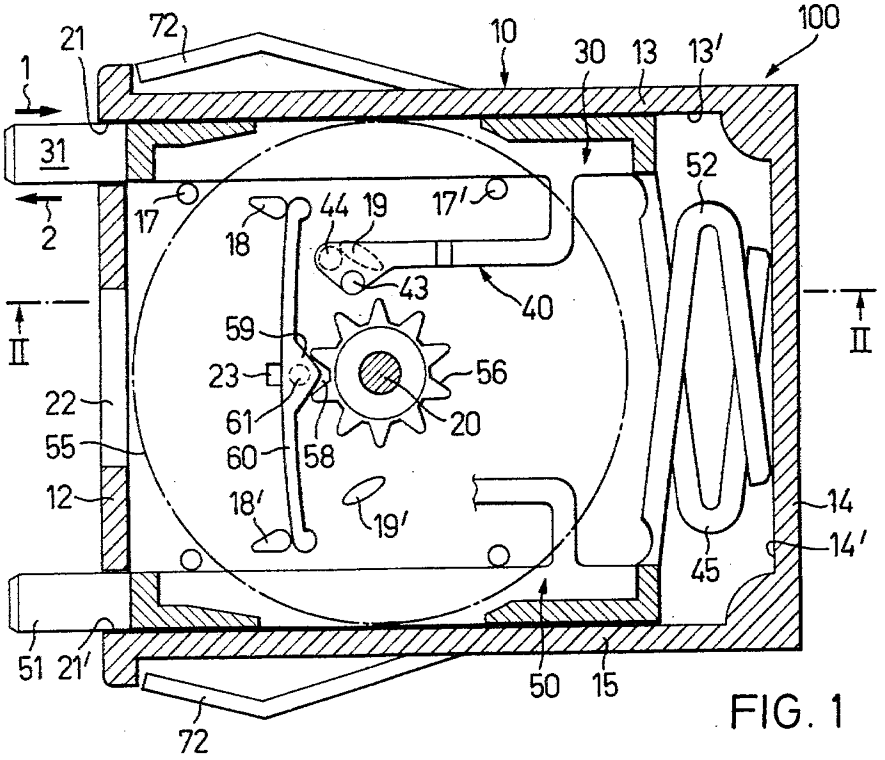
FIG. 1
FIG. 2
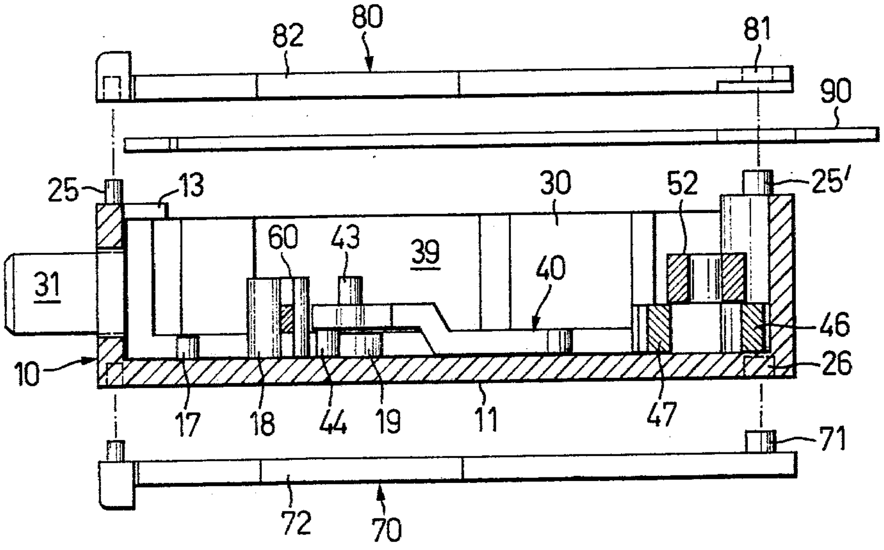

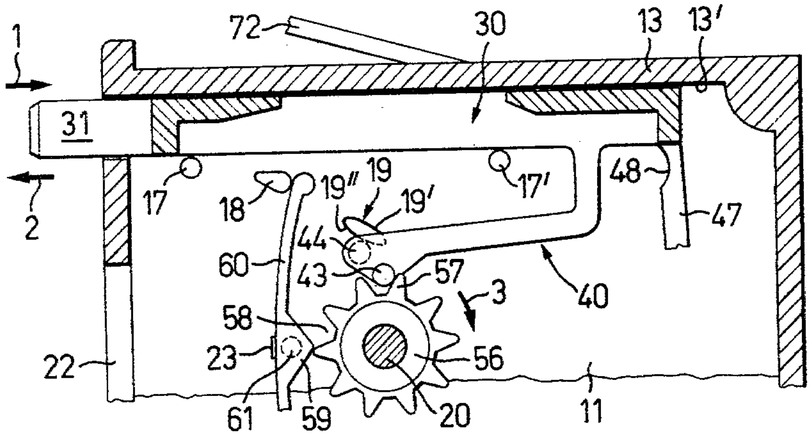
FIG. 3
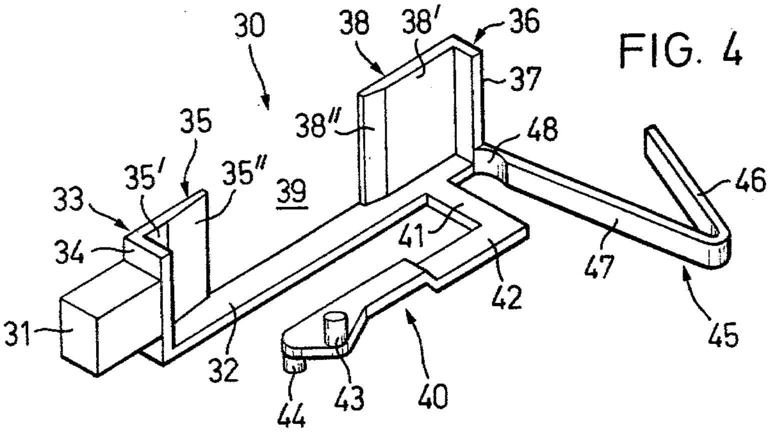
FIG. 4
FIG. 5
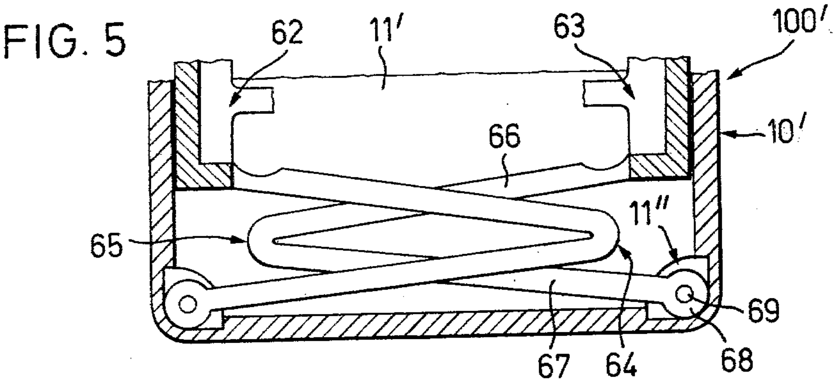

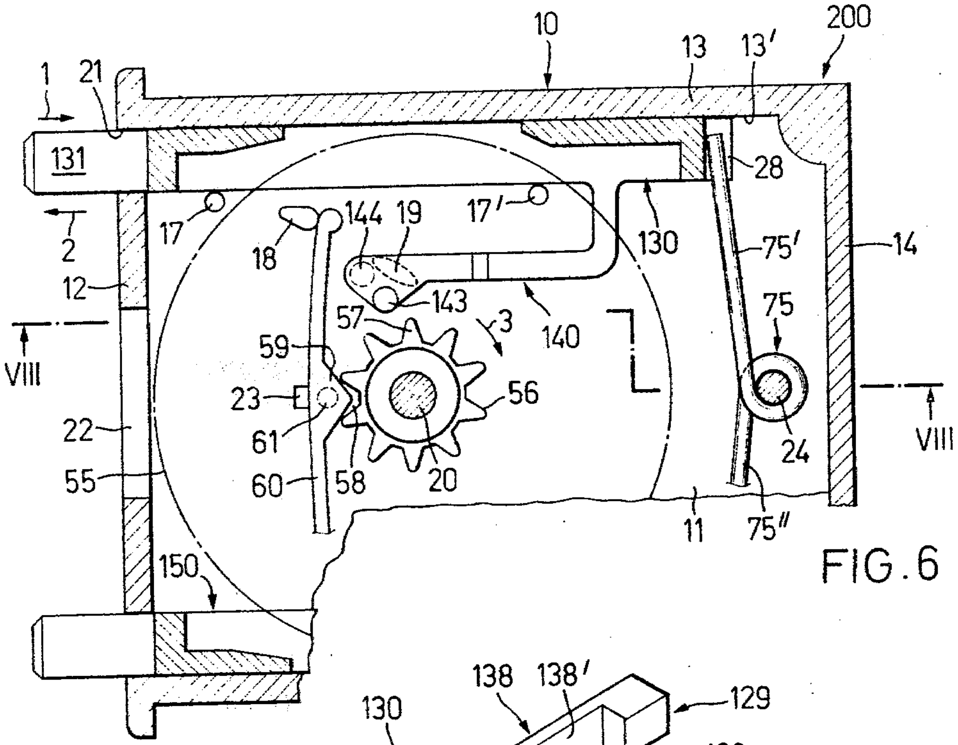
FIG. 6
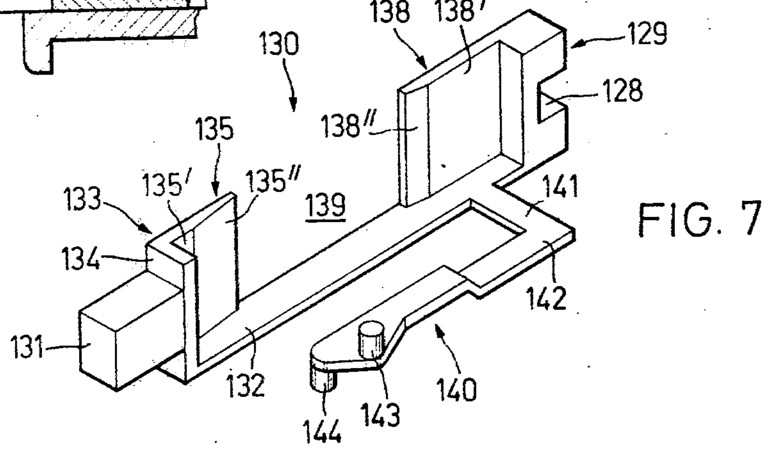
FIG. 7
FIG. 8
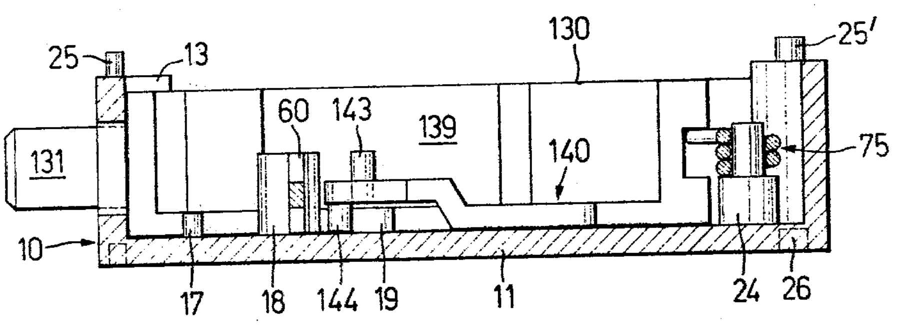

STEPPING MECHANISM FOR A MULTI-POSITION SWITCH

BACKGROUND OF THE INVENTION

The present invention relates to a new and improved construction of a forwardly and rearwardly indexible stepping mechanism for a multi-position switch.

More specifically, the forwardly and rearwardly indexible stepping mechanism for a multi-position switch as contemplated by the invention is of the type which is arranged within a housing and has two individual, functionally independent actuation elements each provided with a push-button, a plunger and a switching or indexing element. These actuation elements, by accomplishing a linear working movement or stroke, can be brought into operative engagement with a pinion of a character support or carrier, the pinion being arranged essentially at the symmetry axis of the housing and operatively associated with a latching or locking spring.

There is already known to the art, from German patent publication No. 1,549,987 a counter mechanism equipped with two push-buttons, each provided with an entrainment member formed thereat and guided by a pin as well as a digit or number wheel provided at one side with switching or indexing pins. During the linear work stroke of the push-buttons the related entrainment member engages with one of the switching or indexing pins, resulting in turning of the digit wheel. Following the work stroke or movement the push-buttons are again pressed back into their starting position by the action of a spring arranged in the related push-button, whereas an appropriately positioned latching spring comes into engagement, by means of a wedge-like tip, at an intermediate space between two switching or indexing pins. With this counter mechanism the switching or indexing operation is initiated by the corresponding push-button and completed by the related latching spring.

Furthermore, there is known to the art, from German Pat. No. 1,590,953, a switch which essentially comprises a housing, an actuation device equipped with a push-button or knob, a switching or indexing wheel operatively connected with a first gear and a digit wheel operatively connected with a second gear. Both gears are always in meshing engagement with one another. The actuation device which is supported by a pressure or compression spring at the inner surface of the housing, comprises a supporting portion at which there are arranged two dimetrically oppositely situated drive pawls which conjointly engage with the switching or indexing wheel. With this switch the actual indexing or switching step is accomplished by the successive disengagement and engagement of both drive pawls during two half steps, in that during a first stroke the one pawl, and during a second stroke, the other pawl rotates the switching or indexing wheel in counterclockwise direction. The number wheel, with this switch, can be turned only in one direction by the actuation device.

SUMMARY OF THE INVENTION

Therefore, with the foregoing in mind it is a primary object of the present invention to provide a new and improved construction of a stepping mechanism for a multi-position switch or the like, which is not afflicted with the aforementioned drawbacks and shortcomings of the prior art proposals.

Another and more specific object of the present invention aims at the provision of a new and improved construction of stepping mechanism of the previously mentioned type, wherein the individual actuation element is designed such that it has a relatively short path of movement for accomplishing the requisite switching or indexing step, there is ensured, without the need for additional adjustments at the switching or indexing elements, an exact indexing operation, and after the indexing operation has been completed each previously operative indexing element positively comes out of engagement with the pinion of the character support or wheel.

Yet a further significant object of the present invention is to provide a stepping or indexing mechanism for a multiposition switch wherein each actuation element is composed of very few individual elements, can be mounted simply without the need to resort to additional aids, and can be economically feasibly fabricated in accordance with conventional injection molding techniques from plastic materials.

Still a further object of the invention is to fulfil the aforementioned objects even then when the stepping mechanism is miniturized.

Now in order to implement these and still further objects of the invention, which will be more readily apparent as the description proceeds, the stepping mechanism for a multiposition switch as contemplated by the invention contemplates that the switching or indexing element which is formed at the plunger of the related actuation element, during each indexing step which is accomplished against the action of a restoring force of a conventional spring element, automatically is shifted out of a rest position and brought into engagement with the pinion of the character support, and upon completion of the indexing step is returned back into its rest position by the spring force.

Some of the more notable advantages which are realized when practising the invention reside in the fact that the forwardly and rearwardly indexible stepping mechanism has relatively few individual parts, typically two actuation elements having formed thereat, for instance by molding, a spring or resilient element, or, however, equipped with individual coil springs, a latching or locking spring and a character support having a gear, typically a pinion by way of example. The switching or indexing element of the corresponding actuation element, and which indexing element can be deflected in position and brought into engagement with the pinion, is capable, without impairing the indexing accuracy of the multiposition switch and the requirement of accomplishing in a positive fashion a complete indexing operation, of being arranged directly at the region of the pinion. By virtue of the fact that the functional elements essentially form a unit with the actuation element, the entire stepping mechanism can be designed optimumly in a compact construction and can be installed, without having to resort to additional aids or auxiliary means, in an appropriately constructed housing.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates on an enlarged scale and in sectional side view a push-button switch having incorporated therein a forwardly and rearwardly indexible stepping mechanism;

FIG. 2 is a plan view of the switch illustrated in FIG. 1, shown in section along the line II—II thereof and in partially exploded illustration;

FIG. 3 is a fragmentary view of the switch shown in FIG. 1 illustrating the stepping mechanism partially actuated;

FIG. 4 is a perspective view showing details of an actuation element of the stepping mechanism;

FIG. 5 is a fragmentary view of a push-button switch of the type shown in FIG. 1 employing a first modification of the inventive actuation element;

FIG. 6 is a fragmentary view of the switch shown in FIG. 1 employing a second modification of the inventive actuation element;

FIG. 7 is a perspective view of the second modification of actuation element shown in FIG. 6; and FIG. 8 is a plan view of the switch, illustrated in FIG. 7, taken in section along the line VIII—VIII thereof and showing mounted therein the actuation element according to the second modification of FIGS. 6 and 7.

DETAILED DESCRIPTION OF THE PREFERRED EMBODIMENTS

Describing now the drawings, FIG. 1 shows in side and sectional view a push-button or multi-position switch 100. Further, there will be recognized a housing 10 formed of a side wall 11, end wall 12, upper and lower walls 13 and 15, and a rear wall 14. Within the housing 10 there is arranged a forwardly and rearwardly indexible stepping mechanism composed essentially of a first actuation element 30, a second actuation element 50, a suitable character support or carrier 55, typically a character wheel, having secured thereat a gear 56, typically a pinion, and a latching or locking spring 60.

FIG. 2 illustrates the switch 100 in section, taken essentially along the line II—II of FIG. 1, and specifically, there will be recognized the essentially box-like configured housing 10 which is closed at one side by the side wall 11 and is constructed to be open at the oppositely situated side. Furthermore, there will be seen the first actuation element 30 which is mounted within the housing 10 as well as part of a spring element 52 of the second actuation element 50. For reasons of simplification and clarity in illustration, there has been shown a schematically portrayed printed circuit board 90 in spaced relationship from the open side of the housing 10 and equally a closure plate 20 likewise shown in spaced relationship from the housing 10, but it is to be understood that the printed circuit board 90 and the closure plate 80 when mounted at the housing 10 close the open side thereof. The housing 10 is provided at its corners, as shown for two of the corners at the top of the illustration of FIG. 2, with at least one respective pin 25 and 25′ which can engage in a press fastener-type fashion in a respective matching bore 81 or the like provided at the closure plate 80. The corners of the side wall 11 are each provided with a bore 26 with which lockingly engage pins 71 of a closure plate 70. Both of the closure plates 70 and 80, in order to improve their retention at the front plate of a switching or control panel or the like, each have two resiliently elastic brackets 72 and 82, respectively.

Now in FIG. 4 there is shown in perspective view details of a first construction of an inventive embodiment of first actuation element 30. This first actuation element 30 essentially consists of a push-button 31 or equivalent structure, a plunger 32, a hairpin-like configured spring element 45, formed at one end of the plunger 32 and composed of two arms 46 and 47, and a switching or indexing element 40. This indexing element 40 is laterally arranged by means of a web 41 at the plunger 32 and extends by means of a further, step-like, flexed switching or indexing arm 42 approximately parallel to the plunger 32. At the end of the switching or indexing arm 42 there is arranged at the lower side thereof a first pin 44 and in spaced relationship to the last-mentioned pin 44 a second pin 43 at the upper side of such indexing arm 42. In order to impart to the actuation element 30 adequate rigidity a respective angle-shaped corner element 33 and 36 is formed or otherwise provided at both ends of the plunger 32. Both of the corner elements 33 and 36 are preferably separated from one another by a recess 39 in order to be able to install an appropriately large size of character carrier or wheel 55. The corner element or piece 33 has an end face or surface 34 and a side wall 35. At the end surface 34 there is arranged the push-button 31 or equivalent actuating-type element, whereas the side wall 35 is preferably structured to be wedge-shaped at its inner region or side 35′, or else, has an appropriately bevelled or inclined surface 35″. The corner element 36 likewise has a side wall 38 having a bevelled or inclined surface 38″ at its inner side or edge 38′, and further, possesses a rear side or surface 37 at which there is laterally formed or otherwise provided the arm 47 of the spring element 45. To ensure adequate elasticity of the entire spring element 45, the connection location between the arm 47 and the rear surface 37 is preferably provided with a notched portion or indentation 48 or equivalent structure.

For the forwardly and rearwardly indexible stepping mechanism of the push-button or multi-position switch 100 shown in FIG. 1, there are required two essentially similar, however mirror-image constructed actuation elements 30 and 50 having their spring elements 45 and 52 arranged elevationally shifted with respect to one another. In the illustrated embodiment, the spring element 45 of the first actuation element 30 is arranged and attached at the bottom of the corner element or piece 36 and the spring element 52 of the second actuation element 50 is arranged and secured over such spring element 45, as particularly apparent from the showing of FIG. 2. Since, as mentioned, both actuation elements 30 and 50 are essentially of the same construction the foregoing disclosure of details of the actuation element 30 should suffice for the understanding of the construction of the other actuation element 50.

Now in FIG. 5 there is shown in fragmentary sectional view a push-button or multi-position switch 100′ having actuation elements 62 and 63 which are modified according to a first variant construction, and which likewise are structured in mirror-image fashion with respect to one another and wherein, in this embodiment there only differ from the embodiment of FIGS. 1 to 4 the construction of the actual spring elements, as will be explained more fully hereinafter. The not particularly illustrated parts of the actuation elements and the switch structure correspond to the analogous structure of the switch parts of FIGS. 1 to 4 discussed above.

Here, in the modified version of FIG. 5, the actuation elements 62 and 63 each have a respective spring element 64 and 65 of equally hairpin-like configuration. At the end of the spring arm 67 of the spring element 65 associated with the actuation element 63 there is provided a bearing eyelet 68. This eyelet 68 is easily pivotable upon a slide and bearing surface 11" about the axis of a pivot pin 69, this slide and bearing surface 11" being provided essentially parallel to the side wall 11' at the corners within the housing 10'. A similar mounting and pivoting arrangement is provided for the other spring element 64 associated with the actuation element 62. These spring elements 64 and 65 are elevationally shifted in position to one another and correspondingly also the related slide and bearing surfaces 11" within the housing 10'.

Continuing, in FIG. 6 there is shown in fragmentary view part of a push-button or multi-position switch 200 having the actuation elements 130 and 150 constructed in a somewhat modified fashion in accordance with a second variant. These actuation elements 130 and 150 are likewise structured in mirror-image relationship with respect to one another and only differ from the first embodiment, discussed above with respect to FIGS. 1 to 4, as concerns their spring-elastic support arrangement within the housing 10. The housing 10, the character support 55 provided with the pinion 56, the latching spring 60 as well as all support and guide elements arranged within such housing corresponding to the embodiment of FIG. 1, and therefore, have been conveniently generally designated with the same reference characters. Both of the actuation elements 130 and 150, mounted within the housing 10, are operatively connected with a coil spring 75 mounted upon a pin 24 or the like.

FIG. 7 shows in perspective view details of the actuation element 130 according to the second variant construction, this actuation element 130 having a push-button 131 or equivalent structure, a plunger 132, a head piece or element 129 formed or otherwise provided at the plunger 132 and a switching or indexing element 140. The head piece 129 is provided at one end face with a groove 128 for receiving an end portion of the coil spring 75 or equivalent resilient element. Here also, the indexing or switching element 140 is laterally arranged, by means of a web 141 or the like, at the plunger 132 and extends by means of a step-like, flexed switching or indexing arm 142 approximately parallel to the plunger 132. At the end of the switching or indexing arm 142 there is arranged at the lower side thereof a first pin 144 and in spaced relation to such pin 144 there is arranged at the upper side of such indexing arm 142 a second pin 143. In order to impart sufficient rigidity to the actuation element 130 there is formed or otherwise provided at one end of the plunger 132 an angle-shaped corner element or piece 133 and at the other end the aforementioned head piece or element 129. Both of the elements 133 and 129 are preferably spaced from one another by recess 139, in order to thus facilitate the installation of the character support or wheel 55. The corner element 133 has an end face or surface 134 and a side wall 135. The push-button 131 or the like is arranged at the end surface 134, whereas the side wall 135 is preferably of wedge-shaped configuration at the inner surface 135' or has a bevelled or tapered surface 135". The head piece 129 likewise possesses a side wall 138 with a bevelled surface 138" at its inner surface 138'.

Here also for the forwardly and rearwardly indexible stepping mechanism of the push-button or multi-position switch 200 shown in FIGS. 6 to 8, there are required two essentially similar, mirror-image constructed actuation elements 130 and 150 and the coil spring 75 or equivalent structure which is mounted upon the pin 24 and provided with two spring arms or portions 75' and 75". In the illustrated embodiment, the one spring arm 75' is operatively connected with the first actuation element 130 and the other spring arm 75" with the second, not further shown actuation element 150. Since this actuation element 150 is structured, as mentioned, essentially like the other actuation element 130 the description of the latter should suffice for understanding the construction of both actuation elements 130 and 150.

Having now hat the benefit of the description of the various constructions of stepping mechanisms their mode of operation will now be considered in conjunction with the push-button or multi-position switch and is as follows:

As apparent from the previously described FIGS. 1 to 8, the forwardly and rearwardly indexible stepping mechanism mounted within the related housing 10 selectively consists of the actuation elements 30 and 50 for the arrangement of FIG. 1, or the actuation elements 62 and 63 for the arrangement of FIG. 5, or however, of the actuation elements 130 and 150 for the arrangement of FIG. 6 as well as the character support or wheel 55, simply shown schematically and in outline, having the related gear or pinion 56 and the latching spring 60. The end face or wall 12 of the housing 10 has a window 22 for facilitating reading of the character support 55 and further possesses two openings 21 and 21' for the insertion and guiding of the corresponding push-buttons 31, 51 and 131 of the related actuation elements. The function of the actuation elements is essentially identical, it being observed that one actuation element is responsible for the forward movement of the character support 55 while the other actuation element governs the return movement of such character support 55.

Upon actuating the corresponding push-button the plunger 32 or 132, as the case may be, and which is guided at the one side at the inner wall 13' of the housing 10 and at the other side by two pins 17 and 17' fixedly connected with the side wall 11, moves in the direction of the arrow 1, while the corresponding actuation element resiliently bears against the inner surface 14' of the rear wall 14. During this movement the indexing element 40 or 140, as the case may be, is shifted in the direction of the arrow 1, so that the lower pin 44 or 144 automatically slides along an inner surface 19" of a preferably elliptically shaped cam or control element 19 which is fixedly connected with the side wall 11, until the upper pin 43 or 143, as for instance illustrated for the actuation element 30 in FIG. 3, comes into engagement with the tooth 57 of the pinion 56. By further actuating the push-button in the direction of the arrow 1 the lower pin 44 slides further along the inner surface 19" of the cam or control element 19 or equivalent structure, whereas the upper pin 43 further moves the pinion 56 in the direction of the arrow 3, this pinion 56 being rotatably mounted at a pin 20 arranged at the inner surface of the side wall 11. Due to the foregoing, a latching cam or dog 59 of the elastic latching or locking spring 60 simultaneously is urged out of the tooth space or gap 58. As soon as the lower pin 44 has reached the outermost point of the cam or control element 19, then the upper pin 43 rotates the pinion 56 through one tooth division and the latching cam or dog 59 again latches into the next tooth gap. By releasing the previously actuated push-button its plunger and thus the corresponding actuation element is moved in the direction of the arrow 2, due to the restoring force of the spring element, in other words such actuation element is moved back into its starting position. During this operation the lower pin 44 slides along the outer surface 19' of the cam or control element 1 likewise into its starting position shown in FIG. 1 and FIG. 6, as the case may be.

By repeated actuation of the push-buttons there are accomplished the momentarily required indexing steps until the character support or wheel 55 has reached the desired position which can be readily read by looking through the viewing window 22.

In the illustrated embodiments the deflection or displacement of the indexing element 40 or 140 is achieved by the lower pin 44 or 144, as the case may be, which is guided at the corresponding cam or control element 19. However, the possibility also exists of guiding the pin by providing a suitably constructed cam-like recess at the inside of the side wall 11. Therefore, in the context of this disclosure and claims the terms "cam" and "control element" are used in their broader sense as covering also this possibility and other equivalents.

The balance-like latching spring 60 is preferably guided by means of a guide pin 61 in a groove 23 provided at the inner side of the side wall 11, as particularly well seen by referring to FIG. 1, and bears at the outer, reinforced ends against appropriately arranged stops or impact members 18 and 18' provided at the inside or inner surface of the side wall 11.

There are required for the forwardly and rearwardly indexible stepping mechanism two symmetrically arranged cams or control elements 19 and 19'.

Finally, it is mentioned that the housing with the cams, pins, stops and so forth arranged at the inner surface or side of the side wall and the actuation elements and the latching springs are preferably fabricated of any suitable plastic material by means of economically feasible and conventional injection molding techniques, so that there is ensured for a rational mass production and equally low fabrication costs.

While there are shown and described present preferred embodiments of the invention, it is to be distinctly understood that the invention is not limited thereto, but may be otherwise variously embodied and practiced within the scope of the following claims. Accordingly,

What we claim is:

1. A forwardly and rearwardly indexible stepping mechanism for a multi-position switch, the stepping mechanism being arranged in a housing and containing two individual, functionally separated actuation elements, each provided with a respective push button, a plunger and a switching element having front and back regions and top and lower sides, upon which actuation element a restoring spring acts and which actuation element can be brought, by a linear work movement, into engagement with the gear of a character support, said gear being arranged at the axis of symmetry of the housing and being operatively connected to a latching spring, comprising the improvements of:

(a) the switching element formed at the plunger of the actuation element is structured to be elastically bendable and during each indexing step, is directed in opposition to the restoring forces and is automatically deflected out of a rest position and brought into engagement with the gear and after completion of the indexing step, can be returned, by the spring force, back into the rest position;

(b) a first pin located at the front region at the lower side of said switching element, said pin being guided at a cam provided in the housing for producing said automatic deflection of said actuation element; and (c) a second pin, located at the front region at the top side of said switching element, said second pin being capable of engaging said gear for producing said indexing step at said switching element.

2. The stepping mechanism as defined in claim 1, wherein:

said spring restoring comprises an essentially hairpin-shaped spring element arranged at each actuation element;

each said spring element having a first spring arm slidingly bearing against an inner surface of said housing and a second spring arm which is formed at the plunger of the related actuation element.

3. The stepping mechanism as defined in claim 1, wherein:

said restoring spring comprises a coil spring having two spring arms;

said coil spring being mounted upon a third pin supported by said housing;

each actuation element engaging with a respective one of the spring arms of said coil spring; and each actuation element comprises a head piece having a groove for movably guiding thereat one of the spring arms of the coil spring.

4. The stepping mechanism as defined in claim 1, wherein:

the indexing element arranged at each actuation element comprises an indexing arm formed at the related plunger and extending essentially parallel to said plunger; and a web for connecting each said indexing arm with its related plunger.

5. The stepping mechanism as defined in claim 1, wherein:

said latching spring has an essentially balance-like construction and is supported within said housing between both of the actuation elements; and said latching spring having a latching nose which can be brought into engagement with said gear means.

6. A forwardly and rearwardly indexible stepping mechanism for a multi-position switch, the stepping mechanism being arranged in a housing, comprising:

a housing;

two individual, functionally separated actuation elements arranged at least in part within said housing;

each of said actuation elements being provided with a push-button, a plunger and an indexing element;

a character support rotatably mounted in said housing;

gear means operatively connected with said character support for rotation thereof;

a latching spring operatively coacting with said gear means;

each of said actuation elements being shiftable through a linear work stroke for bringing its related indexing element into engagement with the gear means of the character support;

spring means for exerting a restoring force upon said actuation elements for movement thereof back into a rest position;

each said indexing element being arranged at its related actuation element;

means coating with said indexing elements so that upon actuation of each actuation element its related indexing element is automatically shifted, against the restoring force of said spring means, during an indexing step out of a rest position and into engagement with said gear means and upon completion of said indexing step such actuation element is returned by the force of said spring means back into its rest position;

the indexing element arranged at each actuation element comprises an indexing arm formed at the related plunger and extending essentially parallel to said plunger;

a web for connecting each said indexing arm with its related plunger;

said means coacting with said indexing elements comprise cam means;

each said indexing arm of each indexing element having a forward region having an upper surface and a lower surface; and the lower surface being provided with a first pin bearing against said cam means and the upper surface being provided with a second pin which can be brought into engagement with said gear means.

* * * * *